United States Patent

Miura et al.

[11] Patent Number: 6,015,873
[45] Date of Patent: *Jan. 18, 2000

[54] POLYPHENOL COMPOSITION AND METHOD OF PRODUCING THE SAME

[75] Inventors: Mareki Miura; Yoshinobu Ohnuma, both of Yokkaichi, Japan

[73] Assignee: Shell Oil Company, Houston, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 08/883,505

[22] Filed: Jun. 26, 1997

[30] Foreign Application Priority Data

Jun. 26, 1996 [JP] Japan ................ 8-165872

[51] Int. Cl.$^7$ ........................................ C08G 8/04
[52] U.S. Cl. ........................ 528/157; 568/720; 568/721
[58] Field of Search .................. 528/129, 157; 568/720, 721

[56] References Cited

U.S. PATENT DOCUMENTS

| | | |
|---|---|---|
| 3,357,946 | 12/1967 | Burgess . |
| 5,410,015 | 4/1995 | Hurley et al. ............ 528/336 |

FOREIGN PATENT DOCUMENTS

| | | | |
|---|---|---|---|
| 0458417 B1 | 5/1991 | European Pat. Off. ....... | C07C 39/17 |
| 57-34122 | 2/1982 | Japan ................ | C08G 59/62 |
| 63-182326 | 7/1988 | Japan ................ | C08G 8/04 |
| 4-26642 | 1/1992 | Japan ................ | C07G 39/17 |

*Primary Examiner*—Robert Dawson
*Assistant Examiner*—D. Aylward

[57] ABSTRACT

A polyphenol composition is provided comprising trisphenol represented by the following formula (I):

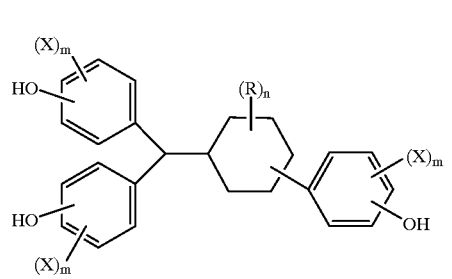

wherein R is a methyl group, X is independently an alkyl group having 1 to 6 carbon atoms, an alkoxy group having 1 to 6 carbon atoms or a halogen atom, and m and n are an integer of 0 to 2 which has an excellent balance between heat resistance and water resistance as a curing agent for epoxy resins.

4 Claims, No Drawings

POLYPHENOL COMPOSITION AND METHOD OF PRODUCING THE SAME

FIELD OF THE INVENTION

The present invention relates to a novel polyphenol composition and a method of producing the same.

BACKGROUND OF THE INVENTION

Various proposals have conventionally been made of polyphenol compounds containing trisphenol and methods of producing the same. For example, Japanese Unexamined Patent Publication No. Sho. 57-34122 proposes polyphenol compounds obtained by condensation reaction of hydroxybenzaldehydes with phenols.

Further, Japanese Unexamined Patent Publication No. Sho. 63-182326 proposes a method of condensation reaction of unsaturated aldehydes such as crotonaldehyde, with phenols in the presence of sulfonic acid catalyst.

However, epoxy resin cured products using those polyphenol compounds as, for example, curing agents for epoxy resins are superior in heat resistance, but are liable to absorb water. For that reason, those polyphenol compounds involve the problems such as occurrence of package cracks when used as materials for encapsulation for semiconductors and decrease in insulating properties when used as an electrically insulating material.

On the other hand, Japanese Unexamined Patent Publication No. Hei. 4-26642 proposes the use of novolak compound for the purpose of improving water resistance, which comprises a bisphenol having an alicyclic structure in the molecule available from limonene or the like.

However, the epoxy resin cured products using this polyphenol compounds as curing agents for epoxy resin are superior in water resistance, but involve the problems that heat resistance and flame retardancy decrease, thereby being not preferable in view of a high temperature reliability.

As described above, the conventional polyphenol compounds involve the problem of water resistance or heat resistance when used as curing agents for epoxy resin.

SUMMARY OF THE INVENTION

According to the invention, a polyphenol composition is provided comprising a trisphenol represented by the following formula (I):

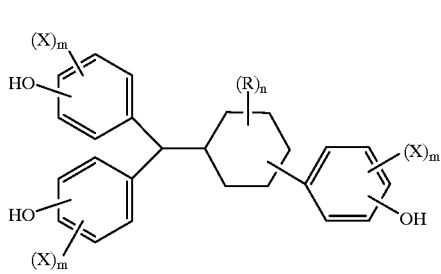

(I)

wherein R is a methyl group, X independently is an alkyl group having 1 to 6 carbon atoms, an alkoxy group having 1 to 6 carbon atoms or a halogen atom, and m and n are an integer of 0 to 2.

A method of producing the polyphenol composition is also provided comprising reacting an alicyclic unsaturated aldehyde represented by the following formula (II):

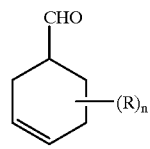

(II)

wherein R is a methyl group, and n is an integer of 0 to 2 and at least one phenol represented by the following formula (III):

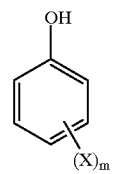

(III)

wherein X independently is an alkyl group having 1 to 6 carbon atoms, an alkoxy group having 1 to 6 carbon atoms, or a halogen atom, and m is an integer of 0 to 2 in the presence of an acid catalyst.

DETAILED DESCRIPTION OF THE INVENTION

The novel polyphenol composition can be obtained by a condensation addition reaction of specific alicyclic unsaturated aldehydes with phenols in the presence of an acid catalyst.

It has been found that the polyphenol composition of the invention has an excellent balance between heat resistance and water resistance when used as a curing agent for epoxy resins.

The polyphenol composition according to the present invention is useful as a raw material of phenolic resins and epoxy resins, and a curing agent for epoxy resins, thereby being useful as a material for encapsulation, a material for laminated boards, a casting material, a molding material, and an electrically insulating material.

(1) Polyphenol composition

The polyphenol composition of the present invention comprises a trisphenol represented by the formula (I):

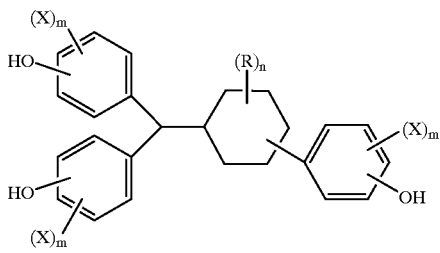

(I)

wherein R is a methyl group, X independently is an alkyl group having 1 to 6 carbon atoms, an alkoxy group having 1 to 6 carbon atoms, or a halogen atom, and m and n are an integer of 0 to 2, but may further contain, for example, an oligomer component of a trisphenol represented by the following formula (IV) in addition to this trisphenol:

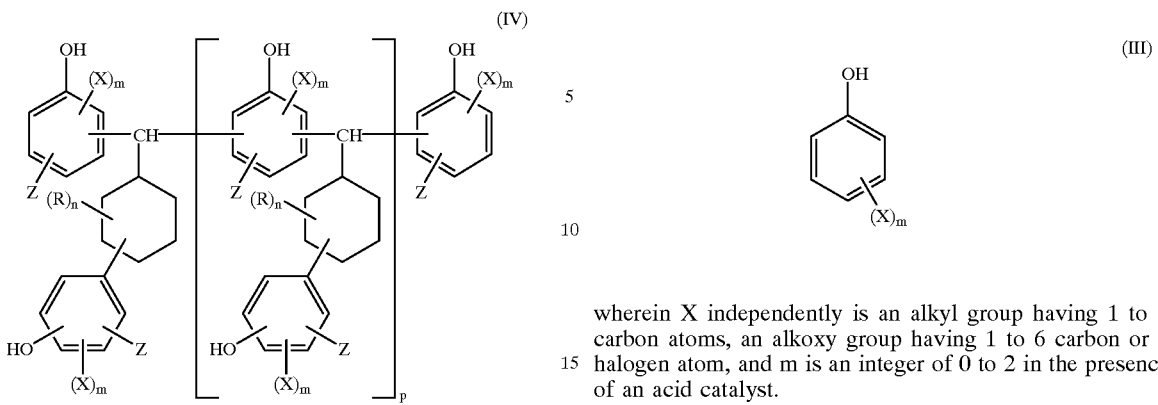

wherein R, X, m and n are the same as defined above, and Z represents hydrogen atom or a group of

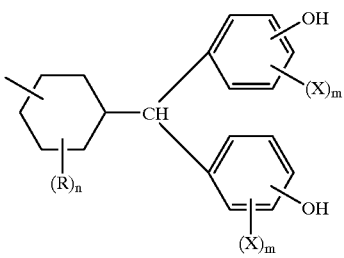

wherein R, X, m and n are the same as defined above, and p is an integer of 1 to 5.

Proportions of the trisphenol and the oligomer of trisphenol which are contained in the polyphenol composition according to the present invention are as follows: the amount of the trisphenol is 5 to 100% by weight, preferably 10 to 90% by weight, and the amount of the oligomer of trisphenol is 95 to 0% by weight, preferably 90 to 10% by weight.

When the polyphenol composition is handled by melting the same with heating, if the amount of the trisphenol is less than 5% by weight, a melt viscosity of the polyphenol composition increases, thereby causing decrease in workability and being not preferable.

(2) Method of producing polyphenol composition

The polyphenol composition according to the present invention is produced by a condensation addition reaction of alicyclic unsaturated aldehydes represented by the general formula (II):

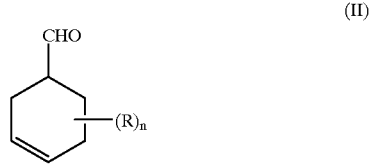

wherein R is a methyl group, and n is an integer of 0 to 2, with phenols represented by the formula (III):

wherein X independently is an alkyl group having 1 to 6 carbon atoms, an alkoxy group having 1 to 6 carbon or a halogen atom, and m is an integer of 0 to 2 in the presence of an acid catalyst.

Examples of the alicyclic unsaturated aldehydes represented by the formula (II) include 3-cyclohexene-1-carbaldehyde, 1-methyl-3-cyclohexene-1-carbaldehyde, 2-methyl-3-cyclohexene-1-carbaldehyde, 3-methyl-3-cyclohexene-1-carbaldehyde, 4-methyl-3-cyclohexene-1-carbaldehyde, 6-methyl-3-cyclohexene-1-carbaldehyde, and 1,2-dimethyl-3-cyclohexene-1-carbaldehyde.

Of those, 3-cyclohexene-1-carbaldehyde is particularly preferred in view of the reactivity with phenols and an easiness for obtaining the raw materials.

It should be noted that 3-Cyclohexene-1-carbaldehyde can be synthesized by, for example, Diels-Alder reaction of butadiene and acrolein.

Further, examples of the phenols represented by the formula (III) include phenol, o-cresol, m-cresol, p-cresol, p-sec-butylphenol, o-tert-butylphenol, p-tert-butylphenol, 2,5-xylenol, 2,6-xylenol, 3-methyl-6-tert-butylphenol, o-methoxyphenol, m-methoxyphenol, p-methoxyphenol, o-ethoxyphenol, chlorophenols and bromophenols.

The acid catalyst used for the production of the polyphenol composition of the present invention acts as a catalyst of dehydration condensation and addition reaction. Specifically, examples of the acid catalyst which can be used include (1) inorganic acid catalysts such as sulfuric acid, sulfuric anhydride, phosphoric acid, polyphosphoric acid, metaphosphoric acid or condensed phosphoric acid, (2) organic acid catalysts such as p-toluenesulfonic acid, trichloroacetic acid, trifluoroacetic acid or methansulfonic acid, and (3) heteropoly acids such as phosphomolybdic acid, phosphotungstic acid, phosphomolybdotungstic acid, phosphomolybdovanadic acid, phosphomolybdotungstovanadic acid, phosphotungstovanadic acid, phosphomolybdoniobic acid, silicotungstic acid, silicomolybdic acid, silicomolybdotungstic acid, silicomolybdotungstovandic acid or germaniumtungstic acid. Further, heteropoly acid salts in which a part of proton of heteropoly acid is replaced with alkali metal, alkaline earth metal or the like may be also used. The amount of the acid catalyst to be used is generally 0.00001 to 1 mol, preferably 0.0001 to 0.5 mol, per mole of the alicyclic unsaturated aldehyde.

In the present invention, the polyphenol composition can be synthesized by a solvent-less reaction or a reaction using an organic solvent which is difficult to dissolve in water and is azeotropical with water, while continuously distilling off water produced. Examples of the organic solvent include (1) aromatic hydrocarbons such as benzene, toluene, xylene, ethylbenzene, diethylbenzene, cumene or mesitylene, (2)

halogenated hydrocarbons such as chloroform, dichloromethane, trichloromethane, tetrachloroethylene, 1,2-dichloroethane, chlorobenzene, dichlorobenzene or chlorotoluene, (3) aliphatic or alicyclic hydrocarbons such as hexane, heptane, octane or cyclohexane, (4) ketones such as methyl isopropyl ketone or methyl isobutyl ketone, or a mixture thereof.

The polyphenol composition of the present invention can be produced by a dehydration condensation and addition reaction of 1 mol of the alicyclic unsaturated aldehydes represented by the formula (II) with 2 to 70 mols, preferably 3 to 50 mols, of the phenols represented by the formula (III), and optionally, with adding an appropriate solvent, at a reaction temperature of 40 to 200° C. for a reaction time of 1 to 20 hours in the presence of the acid catalyst.

If the amount of the phenols to be used is less than 2 mols per mole of the alicyclic unsaturated aldehydes, the proportion of the trisphenol in the polyphenol composition becomes less than 5 parts by weight, thereby being not preferable. Further, if the amount of the phenols to be used exceeds 70 mols, the yield of the polyphenol composition to be obtained is markedly decreased, thereby being not economically desirable.

After completion of the reaction, the acid catalyst contained in the reaction liquid is neutralized with an alkali such as sodium hydroxide, and excess phenols are distilled off at a temperature of 80 to 250° C. and a pressure of 0.1 MPa to 10 Pa. If the higher purity is further required, it is preferred that generally 0.1 to 20 parts by weight, preferably 0.5 to 10 parts by weight, of water are added to 1 part by weight of the polyphenol composition produced, using an organic solvent which is difficult to dissolve in water or without using a solvent, the resulting mixture is washed with stirring, and the resulting mixture is allowed to stand to make oil/water separation, thereby removing the acid catalyst. After completion of the reaction, the reaction mixture is washed with water until the solvent and the like used are substantially removed, preferably until the amount of low boiling residues in the produced polyphenol composition is 2% by weight or less.

The molten polyphenol composition thus obtained is generally discharged from a bottom of a reactor, and solidified to form a product. Further, the polyphenol composition can be transferred in its molten state to a subsequent step such as epoxidization step.

In the case that the polyphenol composition of the present invention is used as a curing agent for epoxy resins, the composition having a high purity, from which catalyst and the like have been removed, is preferably used.

The amount of the polyphenol composition to be added to the epoxy resin varies depending on the types of the epoxy resin. In general, the polyphenol composition is added to the epoxy resin in an amount of 5 to 100 parts by weight per 100 parts by weight of the epoxy resin, and they are mixed in a molten state. The resulting mixture is cured at a temperature of 100 to 200° C. in the presence of a catalyst such as tertiary amines, imidazoles, or phosphoric compounds (e.g., triphenyl phosphine), thereby a rigid cured product can be obtained.

EXAMPLES

The present invention is described in more detail below by referring to the following examples, but the invention is not limited to those examples.

Example 1

One liter four-necked flask equipped with a thermometer, a stirrer, and a condenser was charged with 564 g (6 mols) of phenol, 44 g (0.4 mol) of 3-cyclohexene-1-carbaldehyde and 4.4 g of silicotungstic acid. Reaction was conducted at 80° C. for 7 hours. After completion of the reaction, 1.8 g of 24% sodium hydroxide was added to the flask to neutralize silicotungstic acid, and unreacted phenol was distilled off with a rotary evaporator at a bath temperature of 160° C. under reduced pressure.

Next, 400 g of methyl isobutyl ketone was added to the system to dissolve therein, and inorganic substances were removed by washing with 300 g of pure water three times.

After washing with water, methyl isobutyl ketone was distilled off at a temperature of 100 to 160° C. under reduced pressure, thereby obtaining 129 g of a polyphenol composition as a brown glassy solid. Compositions of trisphenol and oligomer in the polyphenol composition were analyzed with GPC (column: Shodex KF-802, solvent: THF 1 ml/min, detector: RI).

Properties and compositions of the polyphenol composition obtained are shown in Table 1.

Whether or not the composition obtained was the objective compound was confirmed by nuclear magnetic resonance spectrum. Each peak of the spectrum was assigned as follows, and it could be confirmed that the polyphenol composition of the present invention was obtained.

TABLE 1

| Chemical shift (ppm) | Hydrogen assigned |
|---|---|
| 1 to 2 | Hydrogen of cyclo ring |
| 4 to 4.6 | Methine hydrogen adjacent to cyclo ring |
| 6.4 to 7.4 | Hydrogen of aromatic ring |
| 9 to 9.4 | Hydrogen of phenol |

Example 2

339 g (3.6 mols) of phenol, 44 g (0.4 mol) of 3-cyclohexene-1-carbaldehyde and 3.3 g of silicotungstic acid were charged, and reaction was conducted at 80° C. for 8 hours. The subsequent post-treatments were conducted in the same procedure as in Example 1 to obtain 123 g of a polyphenol composition of brown glassy solid. Properties of the polyphenol composition obtained are shown in Table 1.

Examples 3 to 4

Polyphenol compositions were obtained in the same procedure as in Example 1 except that phenols and reaction conditions were changed as shown in Table 1. Properties of the polyphenol compositions obtained are shown in Table 1.

TABLE 1

|  | Example 1 | Example 2 | Example 3 | Example 4 |
|---|---|---|---|---|
| Phenols | Phenol (6 mols) | Phenol (3.6 mols) | o-Cresol (6 mols) | o-Tert-butyl phenol (6 mols) |
| Aldehydes | CHC[*1] (0.4 mol) | CHC[*1] (0.4 mol) | CHC[*1] (0.4 mol) | CHC[*1] (0.4 mol) |
| Acid catalyst | Silicotungstic acid 4.4 g | Silicotungstic acid 3.3 g | Phosphotungstic acid 5.5 g | Phosphotungstic acid 6.6 g |
| Reaction time and temperature | 80° C. 7 hours | 80° C. 8 hours | 90° C. 10 hours | 100° C. 12 hours |
| Yield (g) | 129 | 123 | 148 | 191 |
| Softening temperature (° C.)[*2] | 130 | 134 | 149 | 167 |
| Compositions of polyphenol compound (wt %) Trisphenol | 70.0 | 58.3 | 75.9 | 78.4 |
| Compositions of polyphenol compound (wt %) Oligomer | 30.0 | 41.7 | 24.1 | 21.6 |

*1: 3-Cyclohexene-1-carbaldehyde
*2: JIS-K-7234

According to the present invention, a novel polyphenol composition which is easily handled can be obtained in high yield, it is possible to use the same as an epoxy resin hardener, a material for epoxy resins, and a material for phenolic resins, and it can be expected to use the same as a material for electronic parts.

We claim:

1. A polyphenol composition comprising a trisphenol represented by the following formula (I):

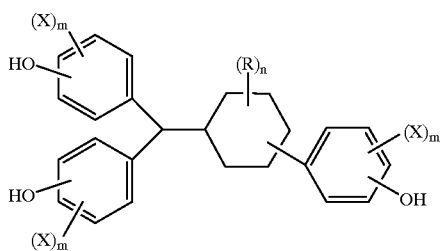
(I)

wherein R is a methyl group, X independently is an alkyl group having 1 to 6 carbon atoms, an alkoxy group having 1 to 6 carbon atoms or a halogen atom, and m and n are an integer of 0 to 2 and 90 to 10% by weight, based on the polyphenol composition, of an oligomer of the trisphenol.

2. The polyphenol composition of claim 1 wherein the oligomer of the trisphenol is present in the composition in an amount of 10 to 90% by weight.

3. A method of producing a polyphenol composition comprising reacting at least one alicyclic unsaturated aldehyde represented by the following formula (II):

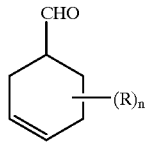
(II)

wherein R is methyl group, and n is an integer of 0 to 2 with at least one phenol represented by the following formula (III):

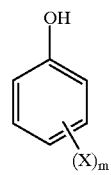
(III)

wherein X is independently an alkyl group having 1 to 6 carbon atoms in an amount of 3 to 50 mols per mole of the alicyclic aldehyde, an alkoxy group having 1 to 6 carbon atoms or a halogen atom, and m is an integer of 0 to 2 in the presence of an acid catalyst.

4. The method of claim 3 wherein the alicyclic unsaturated aldehyde is 3-cyclohexene-1-carbaldehyde.

* * * * *